US007493914B2

(12) United States Patent
Welker

(10) Patent No.: US 7,493,914 B2
(45) Date of Patent: Feb. 24, 2009

(54) NEWTONIAN THRUST COWL ARRAY

(75) Inventor: Robert H. Welker, Washington, TX (US)

(73) Assignee: Welker, Inc., Sugar Land, TX (US)

( * ) Notice: Subject to any disclaimer, the term of this patent is extended or adjusted under 35 U.S.C. 154(b) by 670 days.

(21) Appl. No.: 11/161,033

(22) Filed: Jul. 20, 2005

(65) Prior Publication Data
US 2007/0017209 A1 Jan. 25, 2007

(51) Int. Cl.
F16K 11/07 (2006.01)
(52) U.S. Cl. ............................ 137/625.49; 137/625.33; 137/219; 251/118
(58) Field of Classification Search ............ 137/625.13, 137/625.33, 625.49, 869, 219; 251/118
See application file for complete search history.

(56) References Cited

U.S. PATENT DOCUMENTS

| 313,981 | A | | 3/1885 | Burch |
| 1,547,962 | A | | 7/1925 | Seewer |
| 1,676,150 | A | | 7/1928 | Mawby |
| 2,483,163 | A | * | 9/1949 | Warren et al. ................ 251/319 |
| 2,618,925 | A | | 11/1952 | Wislicenus |
| 2,774,554 | A | | 12/1956 | Ashwood et al. |
| 2,868,176 | A | | 1/1959 | Bennett |
| 2,947,501 | A | | 8/1960 | Flint |
| 2,974,680 | A | | 3/1961 | Kreuttner |
| 3,137,266 | A | | 6/1964 | Perrier et al. |
| 3,348,380 | A | | 10/1967 | Rees |
| 3,354,648 | A | | 11/1967 | Asahina |
| 3,381,713 | A | | 5/1968 | Jacobsen |
| 3,451,404 | A | | 6/1969 | Self |
| 3,474,966 | A | | 10/1969 | Holmes |
| 3,492,965 | A | | 2/1970 | Wayfield |
| 3,618,861 | A | | 11/1971 | Holmes |
| 3,675,611 | A | | 7/1972 | Glass |
| 3,680,315 | A | | 8/1972 | Aschauer et al. |
| 3,700,189 | A | | 10/1972 | Timperman |
| 4,023,355 | A | * | 5/1977 | McDonald ............. 137/625.33 |
| 4,056,073 | A | | 11/1977 | Dashew et al. |
| 4,138,963 | A | | 2/1979 | Thompson |
| 4,193,422 | A | * | 3/1980 | Rider .................... 137/625.49 |
| 4,241,876 | A | | 12/1980 | Pedersen |
| 4,265,192 | A | | 5/1981 | Dunn |
| 4,455,960 | A | | 6/1984 | Aker |
| 4,559,275 | A | | 12/1985 | Matt et al. |
| 4,807,552 | A | | 2/1989 | Fowler |
| 5,024,254 | A | * | 6/1991 | Yamagiwa .................. 137/219 |

(Continued)

FOREIGN PATENT DOCUMENTS

GB 2279408 A 1/1995

(Continued)

Primary Examiner—John Fox
(74) Attorney, Agent, or Firm—Husch Blackwell Sanders, LLP

(57) ABSTRACT

The three-way valve allows fluid flow to be selectively directed to a run outlet, a bypass outlet or both at the same time. The three-way valve includes a flow diffuser with a primary valve seat positioned opposite a bypass valve seat. Choke points and flow restrictions, strategically positioned in the flow diffuser create a substantially flat velocity profile downstream of the bypass outlet. Larger versions of this three-way valve may be used in Vertical Takeoff and Landing ("VTOL") aircraft. Other versions may be used in ships and other watercraft.

7 Claims, 9 Drawing Sheets

U.S. PATENT DOCUMENTS

| | | |
|---|---|---|
| 5,062,588 A | 11/1991 | Garland |
| 5,098,022 A | 3/1992 | Thayer |
| 5,110,047 A | 5/1992 | Toews |
| 5,129,846 A | 7/1992 | Dimijian |
| 5,307,830 A | 5/1994 | Welker |
| 5,454,640 A | 10/1995 | Welker |
| 5,481,868 A | 1/1996 | Davies et al. |
| 5,531,484 A | 7/1996 | Kawano |
| 5,699,966 A | 12/1997 | Beverage |
| 5,730,416 A | 3/1998 | Welker |
| 5,769,388 A | 6/1998 | Welker |
| 6,142,841 A | 11/2000 | Alexander, Jr. et al. |
| 6,250,330 B1 | 6/2001 | Welker |
| 6,289,934 B1 | 9/2001 | Welker |
| 6,439,267 B2 | 8/2002 | Welker |
| 6,568,635 B2 | 5/2003 | Carpenter |
| 7,000,634 B2 * | 2/2006 | Lindborg ................ 137/625.3 |

FOREIGN PATENT DOCUMENTS

| | | |
|---|---|---|
| JP | 59140973 | 8/1984 |
| JP | 62258722 | 11/1987 |
| JP | 2003194018 | 7/2003 |

* cited by examiner

NEWTONIAN THRUST COWL ARRAY

BACKGROUND OF THE INVENTION

The Newtonian Thrust Cowl Array is a three-way valve with a flow diffuser to reduce downstream turbulence. This invention creates a relatively flat downstream velocity flow profile which results in more accurate flow measurements by downstream ultrasonic flow meters.

This three-way valve may be used in a variety of other situations, e.g., vertical take-off and landing ("VTOL") jet airplanes to direct the thrust from the jet engines or ships.

Flow diffusers of various types have been previously used to reduce turbulence in valves and piping systems in general. For example, Robert H. Welker, the inventor of the present patent application has also developed prior art flow diffusers shown in U.S. Pat. Nos. 5,769,388; 6,250,330; 6,289,934 and 6,439,267. The flow diffuser shown in U.S. Pat. No. 5,769,388 was used in conjunction with a control valve to reduce downstream turbulence. U.S. Pat. No. 6,250,330 discloses a diaphragm regulator with removable diffuser. The removable flow diffuser in U.S. Pat. No. 6,289,934 was used in an elbow to reduce downstream turbulence. The adjustable flow diffuser in U.S. Pat. No. 6,439,267 was also used in elbows and piping systems.

Robert H. Welker has developed other solutions to turbulent flow including U.S. Pat. Nos. 5,307,830; 5,454,640 and 5,730,416. These three patents disclose a set of tubes instead of the flow diffuser discussed above.

SUMMARY OF THE INVENTION

A three-way valve with a flow diffuser reduces downstream turbulence and produces a flat velocity profile in the flowing fluid, which is an advantage to ultrasonic measurement. In larger versions of the three-way valve, it can be used to direct the thrust from a jet engine in a VTOL airplane. Larger versions of the three-way valve can also be used in ships with side thrusters.

DETAILED DISCLOSURE OF THE INVENTION

Figure 1:
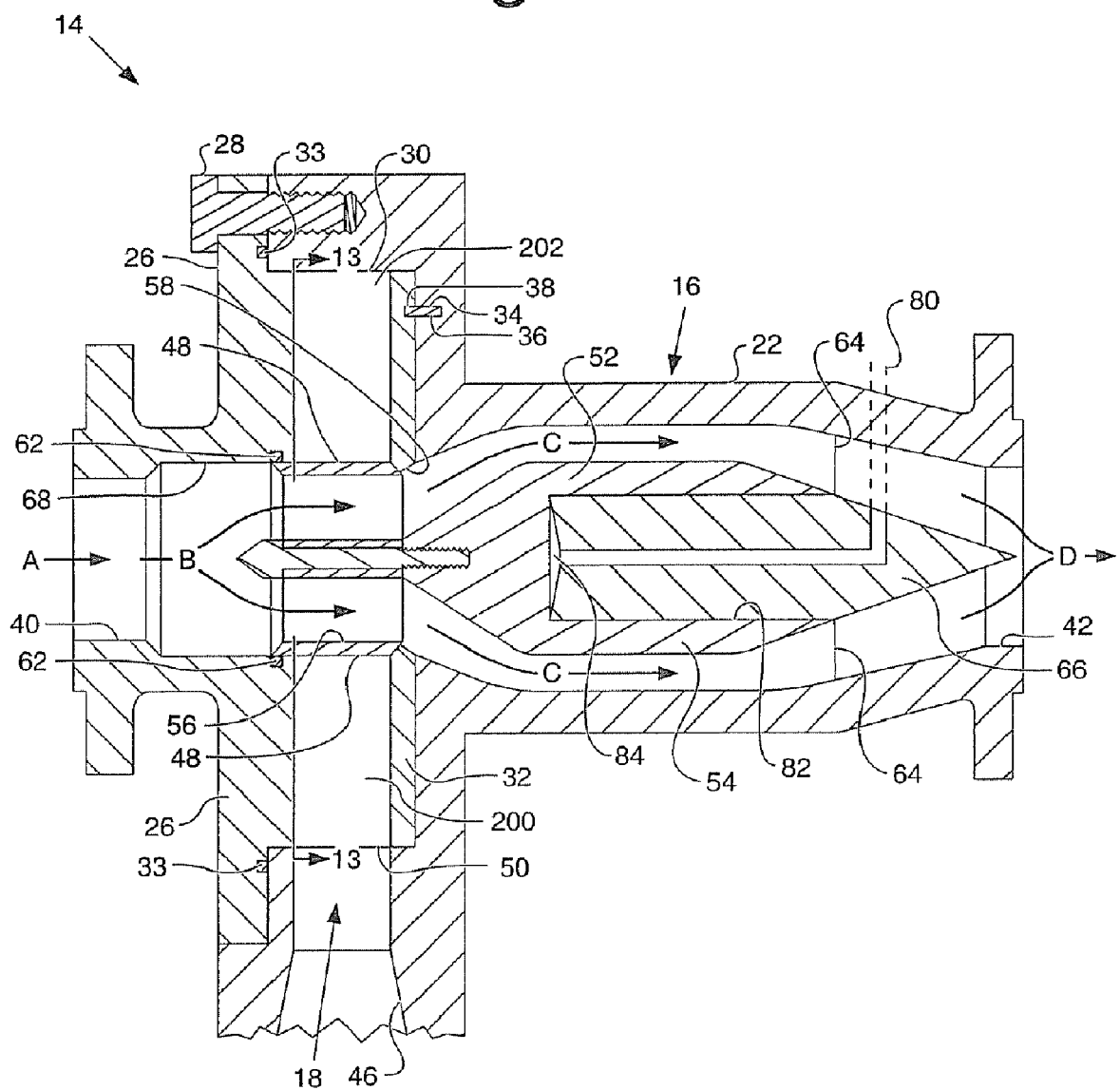
FIG. 1 is a section view of the three-way valve with flow diffuser in the open position to the run valve outlet.
Figure 5:
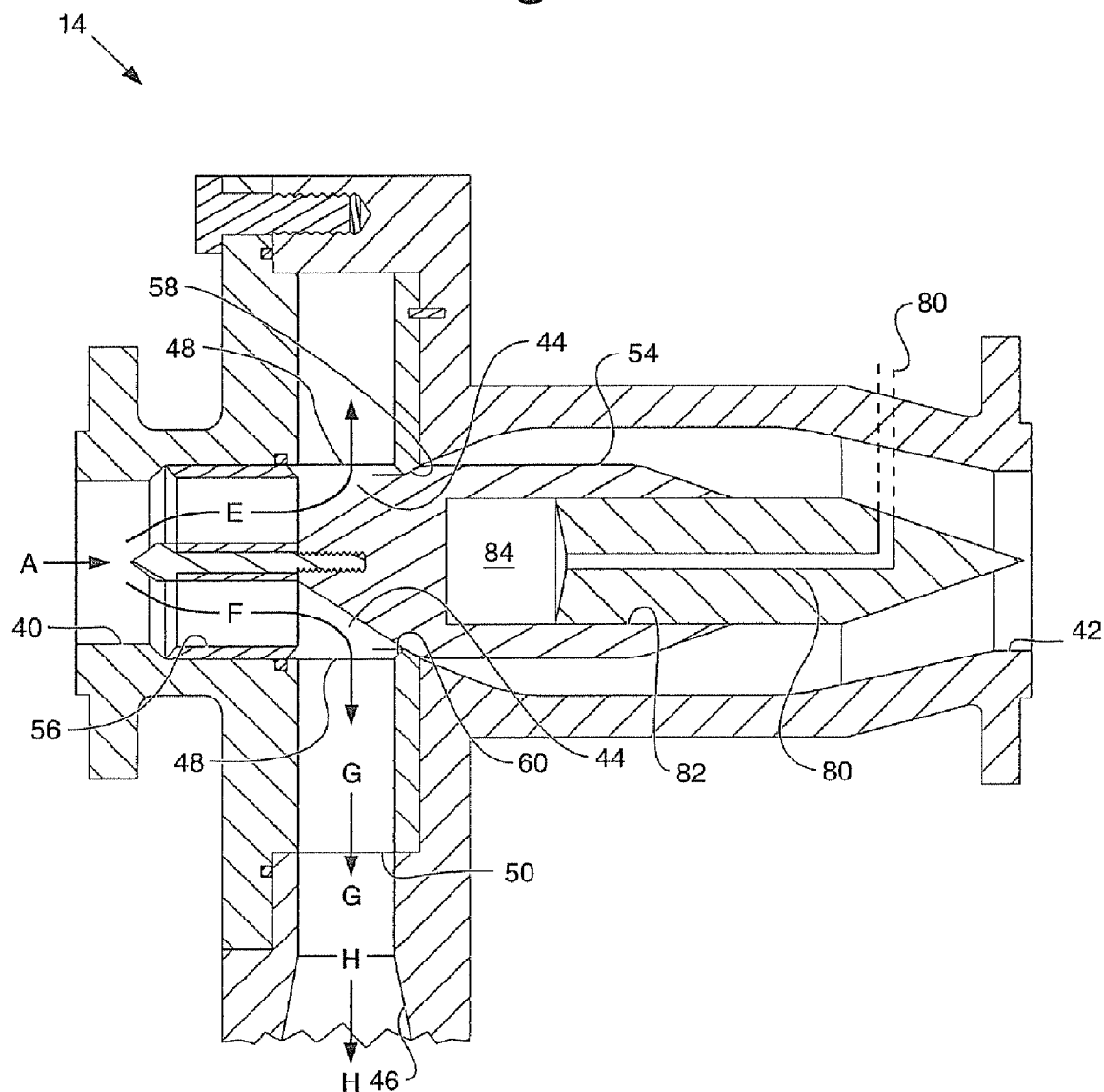
FIG. 5 is a section view of the three-way valve with flow diffuser of FIG. 1 in the open position to the bypass outlet.
Figure 6:
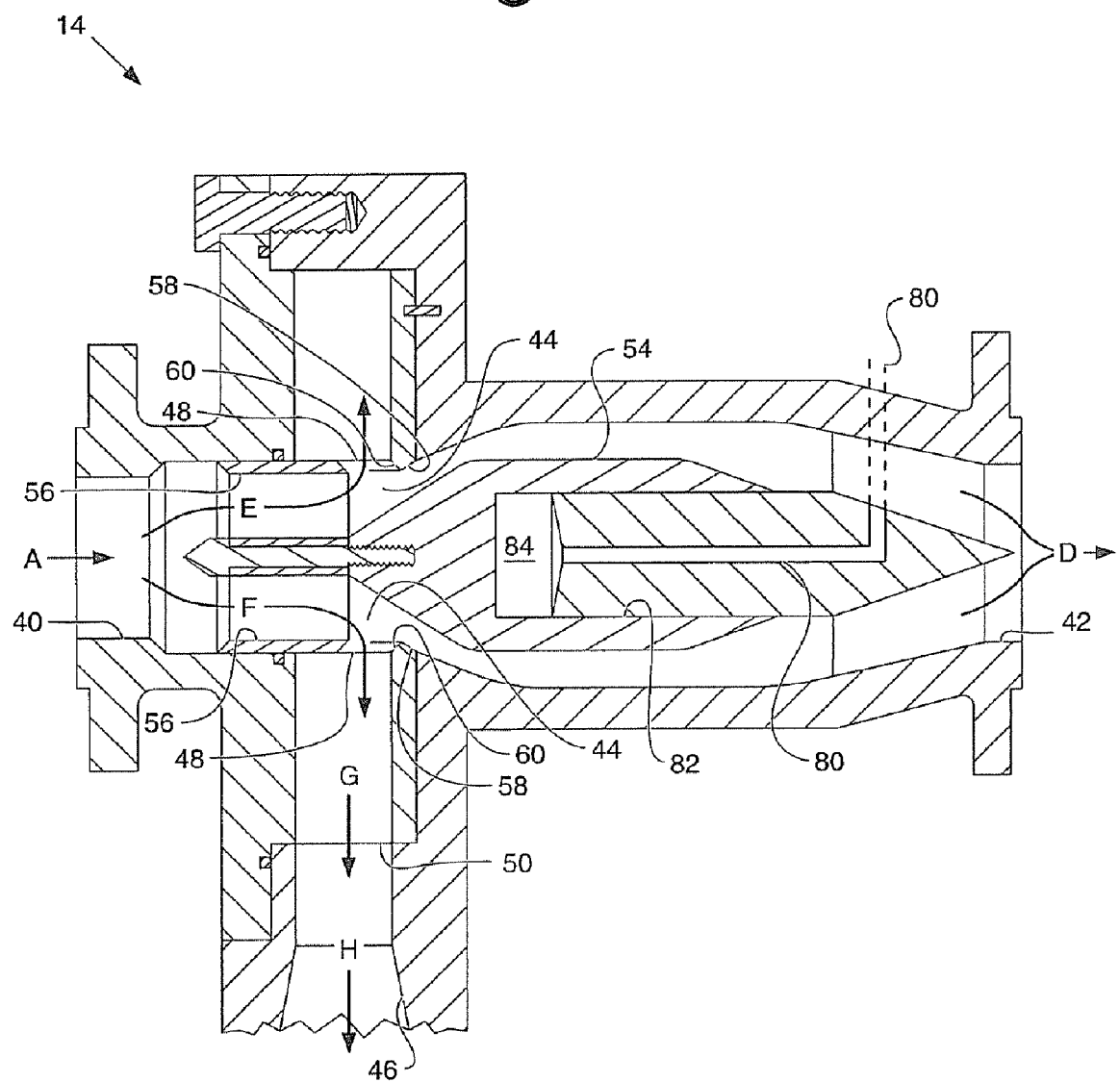
FIG. 6 is a section view of the three-way valve with flow diffuser of FIG. 1 open to both the run outlet and the bypass outlet.

Referring now to FIGS. 1, 5 and 6, the three-way valve with flow diffuser is generally identified by the numeral 14. Like all three-way valves, the fluid flow may be directed to three different settings as shown by FIGS. 1, 5 and 6. The body 22 includes a primary frame 24 and a removable cap 26 which is connected to the primary frame by a plurality of bolts, only one of which 28 is shown in the drawings. The primary frame and the cap form a receptacle 30 sized and arranged to receive the removable flow diffuser 32. When the bolts are removed, the cap disengages from the primary frame allowing maintenance or removal of the flow diffuser 32. A channel and seal 33 are positioned in the cap 26 to engage the primary frame 24 and seal the receptacle 30. An alignment pin 34 is seated in an aperture 36 of the primary frame and an aperture 38 in the flow diffuser. The three-way valve with flow diffuser 20 defines a run inlet 40, a run outlet 42, a bypass inlet 44 and a bypass outlet 46. The flow diffuser 32 has a flow diffuser inlet 48, better seen in FIG. 12 and a flow diffuser outlet 50. In the case of VTOL aircraft, the bypass inlet 44 may also be referred to as a vertical takeoff inlet and the bypass outlet 46 may also be referred to as a vertical takeoff outlet.

Figure 2:
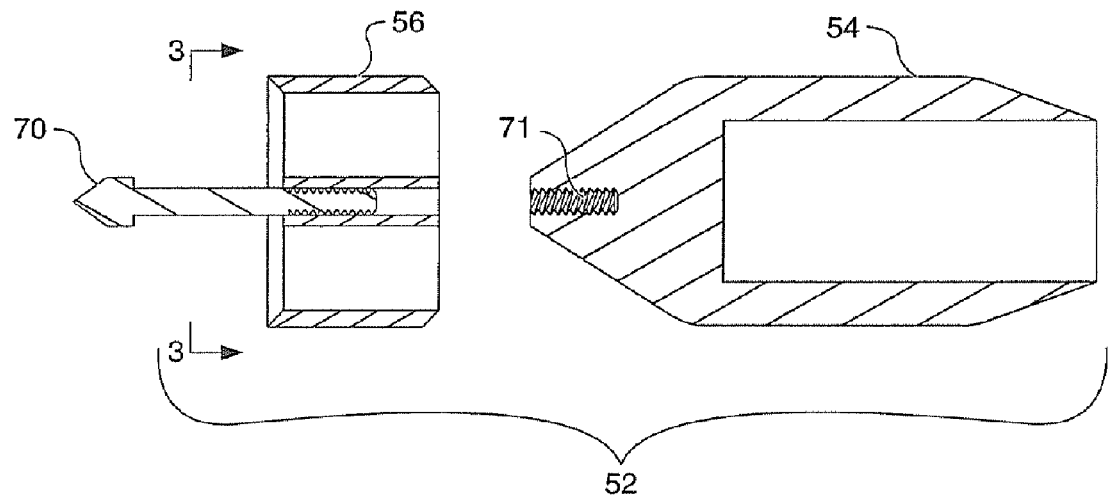
FIG. 2 is an exploded section view of the movable valve element of FIG. 1.
Figure 3:
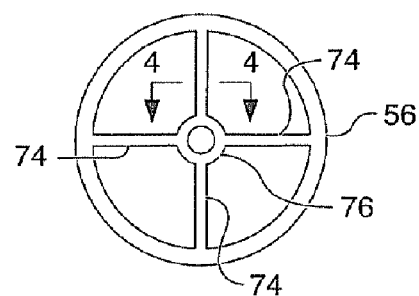
FIG. 3 is a front view of the movable valve element of FIG. 2 along the line 3-3.

As previously mentioned, the three-way valve with flow diffuser 14 has three operational positions show in FIGS. 1, 5 and 6. In FIG. 2, fluid flows from the run inlet 40 to the run outlet 42 as shown by the flow arrows. FIG. 1 may sometimes be referred to as the full open or full run position with the bypass valve 18 in the full closed position. In FIG. 5, fluid flows from the run inlet 40, through the bypass inlet 44 to the flow diffuser inlet 48, the flow diffuser outlet 50 to the bypass outlet 46, as shown by the flow arrows. FIG. 2 may sometimes be referred to as the bypass valve in the full open position and the run valve 16 in the full closed position. In FIG. 6, all of the fluid enters the run inlet, and a portion exits the run outlet 42 and the other portion flow through the flow diffuser 32 and exits the bypass outlet 46. FIG. 3 may sometimes be described as the split flow position.

A movable valve element 52 includes a primary valve element 54 and a bypass valve element 56. A primary valve seat 58 is formed opposite to a bypass valve seat 60 on a protruding portion of the flow diffuser, better seen in FIG. 13. In FIG. 1 the bypass valve element 56 is in sealing engagement with the bypass valve seat 60 sealing against fluid flow into the flow diffuser 32 and the bypass outlet 46. In FIG. 2, the primary valve element 54 is in sealing engagement with the primary valve seat 58 sealing against fluid flow to the run outlet 42. In FIG. 3, there is no seal on either the primary valve seat 58 or the bypass valve seat 60, thus allowing fluid to flow to both the run valve outlet 42 and the bypass outlet 46. A channel and seal 62 are formed in the removable cap 26 to seal against the bypass valve element 56. The seals 62 and 33 are shown as o-rings, but may be metal seals depending on the type of service required.

A support 64 is connected to the tail cone 66. The support extends from the primary frame 24 to the tail cone and may be a plurality of vanes or a single column to hold the tail cone in place. The support 64 holds the tail cone 66 in position in the three-way valve. The tail cone 66 supports the primary valve element 54 and a channel 68 supports the bypass valve element 56. Together, the movable valve element 52 is supported by the channel 68 on the end proximate the run inlet 40 and by the support 64 on the end proximate the run outlet 42. The movable valve element slides back and forth in the channel 68 and over the tail cone 66 which act as supports. These supports allow the movable valve element 54 to move back and forth to the different positions shown in FIGS. 1, 5 and 6.

The movable valve element 54 may be actuated by any suitable means 78, such as a mechanical screw, not shown or by hydraulic means shown in FIGS. 1, 5 and 6. The hydraulic actuation means includes a pressurized source of hydraulic fluid, not shown, and a control means, not shown, to apply and drain pressurized hydraulic fluid through the conduit 80. The primary valve element 54 forms a cylinder 82 that slides over the tail cone 66 forming a chamber 84 to receive hydraulic fluid from the pressurized source, not shown. Pressurized fluid flows through the conduit 80 to the chamber 84. The tail cone 66 is held in a stationary position by the support 64. As the pressure builds in the chamber 84, it drives the movable valve element towards the run inlet 40 and into sealing engagement with the primary valve seal 58, as best seen in FIG. 5 in which the bypass valve is in the full open position. When the hydraulic pressure in the chamber 84 is reduced, the movable valve element moves to the position of FIG. 6, the split flow position, with fluid exiting both the run outlet 42 and the bypass outlet 46. When there is no hydraulic pressure in the chamber 84, pressure from the fluid flowing through the three-way valve 14 forces the movable valve element back into the position of FIG. 1. wherein the bypass valve is fully closed and the run valve is fully open. The hydraulic means shown is single acting. However, in some cases it may be designed as double acting if it is desirable to control the speed of closing the bypass valve 56. The run valve 16 includes the body 22, the movable valve element 52, and the means for actuating 78. The bypass valve includes the flow diffuser 32, the movable valve element 52, the body 22 and the means for actuating 78. The three-way valve 14 includes the run valve 16 and the bypass valve 18.

Figure 4:
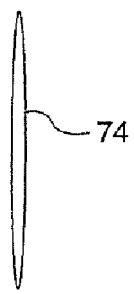
FIG. 4 is a section view of a web of FIG. 3 along the line 4-4.

Referring now to FIGS. 2, 3 and 4, the movable valve element 52, will be shown in greater detail. The movable valve element includes the primary valve element 54 and the bypass valve element 56, which are dissembled and shown in section view in FIG. 2. A pointed bolt 70 is a means for connecting the bypass valve element to the primary valve element. The bypass valve element forms a cylindrical closure 72, as best seen in FIG. 3, with a plurality of webs 74 extending from the cylindrical closure to a center 76 which is sized and arranged to receive the bolt 70. A threaded receptacle 71 is formed in the primary valve element to receive the bolt 70. The webs 74 are aerodynamic in cross section as shown in FIG. 4. The movable valve element 52 is shown in these figures being formed from several different parts; however, the actual construction is a matter of manufacturing convenience. For example, movable valve element formed from one part may also be suitable for this invention.

Figure 7:
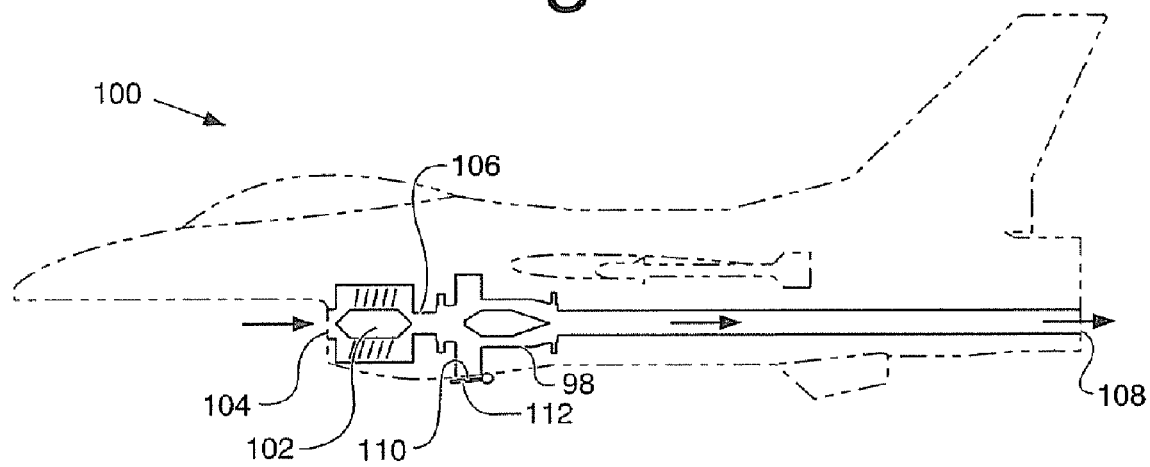
FIG. 7 is a section view of a VTOL jet airplane with the three-way valve with flow diffuser therein.
Figure 8:
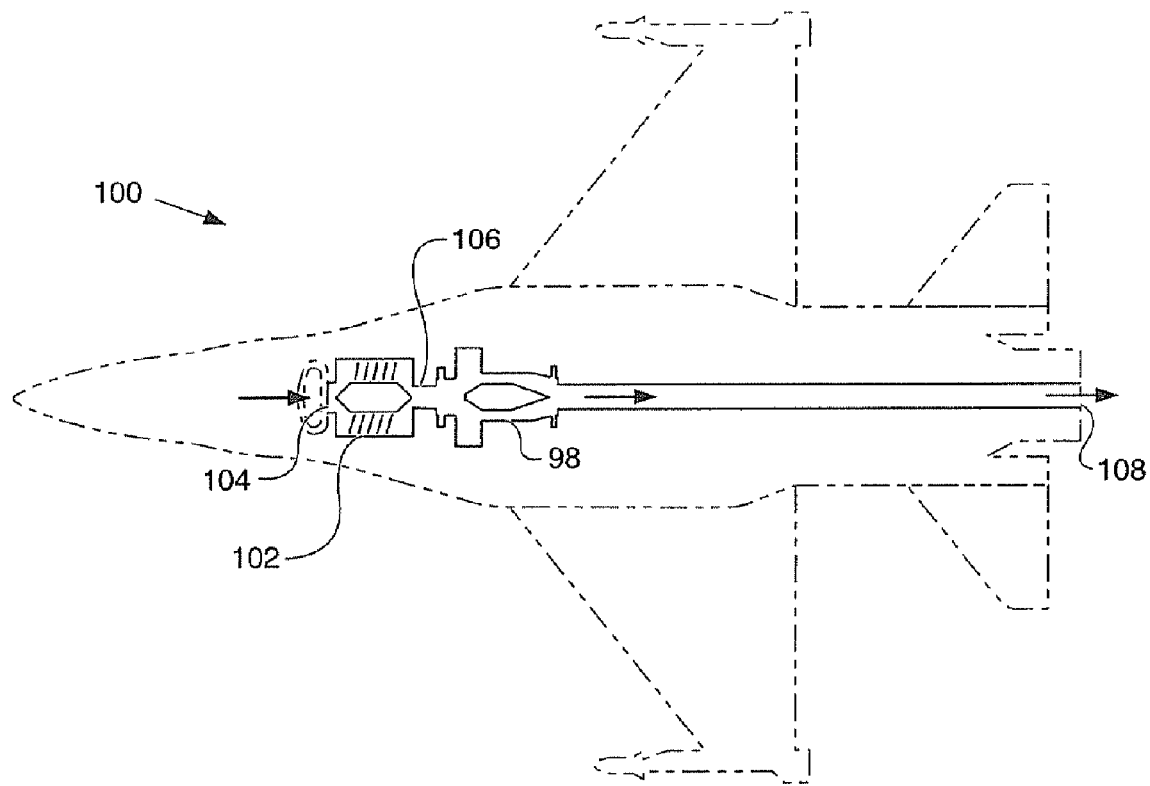
FIG. 8 is a top plan view of the VTOL jet airplane of FIG. 7.

Referring now to FIGS. 7 and 8, a thrust controller 98 is positioned in a jet aircraft 100. The jet aircraft is designed for vertical takeoff and landing ("VTOL"). The jet aircraft has a jet engine 102, schematically portrayed in these drawings, with an air intake 104 and an exhaust 106 connected to the thrust controller 98 which is connected to both the tail pipe 108 and vertical takeoff outlet 110. An adjustable door 112 covers the vertical takeoff outlet 110 and normally is in the closed position as shown in FIG. 7 during flight. However, the door is opened to various angles during vertical takeoff and landing maneuvers. If the door 112 is only partially opened, it helps the aircraft 100 to slow down in preparation for landing. The door 112 will be fully opened during the vertical phase of takeoff and landing.

The thrust controller 98 is the same as the three-way valve 14, except that the seals 33 and 62 must be suitable for service with very hot gases, such as those generated by jet engines and the other components of the valve must likewise be suitable for such extreme service. The parts and components of the thrust controller 98 have the same names and identification numerals of the three-way valve 14. The bypass outlet 46 is in fluid communication with the vertical takeoff outlet 110 to allow VTOL.

To commence vertical takeoff, the thrust controller 98 is actuated into the position of FIG. 5 and the adjustable door 112 will be fully opened, prior to starting the jet engine 102. The hot exhaust from the jet engine will pass through the bypass outlet 46 and into the vertical takeoff outlet 110 of the aircraft 100. This thrust will be directed towards the ground, allowing the aircraft to lift off. Once in a hover position, the thrust controller will be shifted to the position of FIG. 6, allowing some of the hot gases to exit the tailpipe 108 of the aircraft. As the aircraft commences forward movement, the thrust controller 98 will be adjusted to the position of FIG. 1 with all the hot gases from the jet engine exiting the tailpipe 108. Before the jet picks up much speed, the adjustable door 112 is fully closed.

Figure 9:
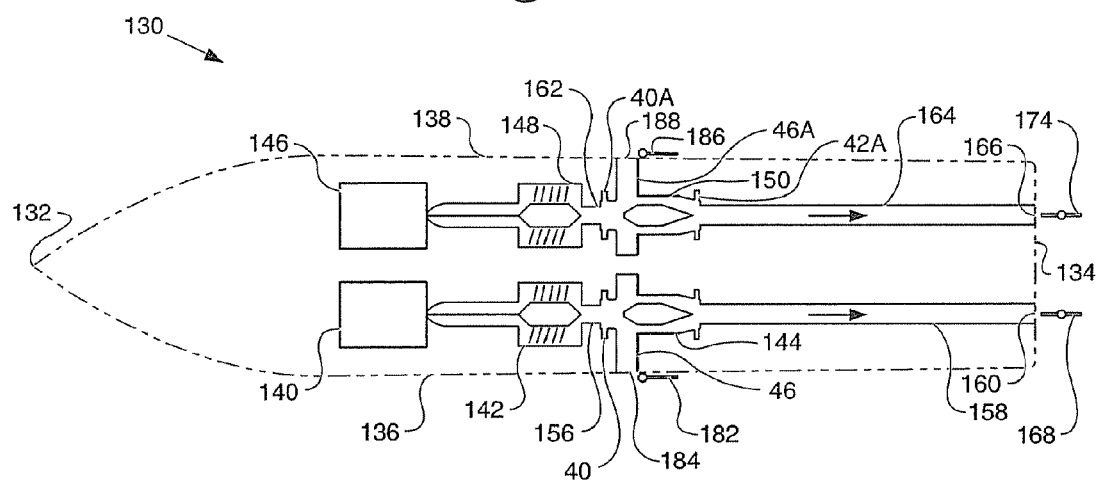
FIG. 9 is a plan view of a ship with two three-way valves with flow diffusers therein.
Figure 10:
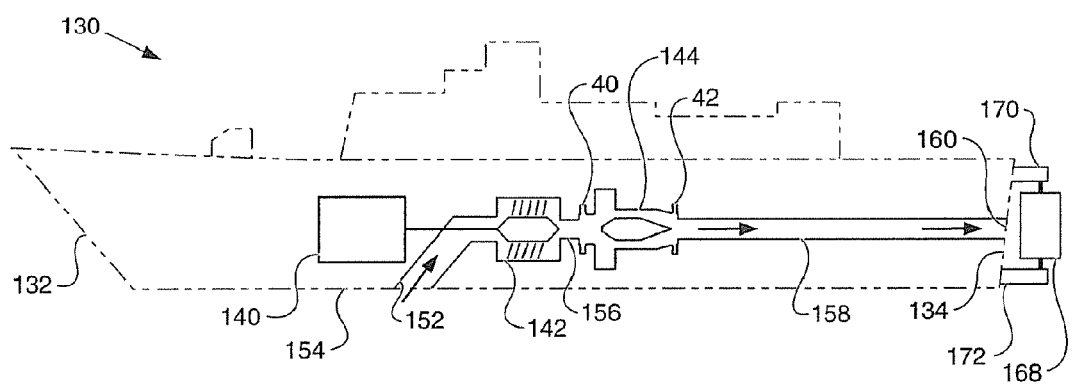
FIG. 10 is a section view of the ship of FIG. 9.

Referring now to FIGS. 9 and 10, a ship 130 is shown in plan view and in section view. The ship may sometimes be generically referred to as a watercraft. The watercraft 130 has a bow 132, a stern 134, a port side 136 and a starboard side 138. The watercraft has a port power plant 140 to drive a port propulsion unit 142 which is in fluid communication with a port thrust controller 144. The watercraft has a starboard power plant 146 to drive a starboard propulsion unit 148 which is in fluid communication with a starboard thrust controller 150. The port water intake 152 is located at the bottom 154 of the watercraft. The starboard water intake, not shown, is likewise located at the bottom of the watercraft. The port turbine outlet 156 is in fluid communication with the run inlet 40 of the port thrust controller 144 and the run outlet 42 is in fluid communication with the port thrust conduit 158. The port thrust conduit outlet 160 is located at the stern of the watercraft. The starboard turbine outlet 162 is in fluid communication with the run inlet 40A of the starboard thrust controller 150 and the run outlet 42A is in fluid communication with the starboard thrust conduit 164. The starboard thrust conduit outlet 166 is located at the stern of the watercraft.

A port rudder 168 is supported by an upper port rudder stanchion and a lower port rudder stanchion. A starboard rudder 174 is supported by an upper starboard rudder stanchion, not shown, and a lower starboard rudder stanchion, not shown. A rudder control means, not shown, independently controls the direction of each rudder. Fluid flows from the port water intake, through the port propulsion unit 143, the port thrust controller 144, the port thrust conduit 158 and exits the port thrust conduit outlet 160 at the port rudder 168. Likewise fluid flows through the starboard water intake, not shown, through the starboard propulsion unit 148, the starboard thrust controller 150, the starboard thrust conduit 164 and exits the starboard thrust conduit outlet 166 at starboard rudder 174.

An adjustable port turning plane 182 is positioned proximate the port amidships outlet 184 and an adjustable starboard turning plane 186 is positioned proximate the starboard amidships outlet. The bypass outlet 46 of the port thrust controller 144 is in fluid communication with the port amidships outlet 184; the bypass outlet 46A of the starboard thrust controller 150 is in fluid communication with the starboard amidships outlet 188. These amidships outlets may be used to reverse direction or slow down forward progress of the watercraft as shown in FIG. 11 or they may be used to help maneuver the watercraft as shown in FIG. 12.

Figure 11:
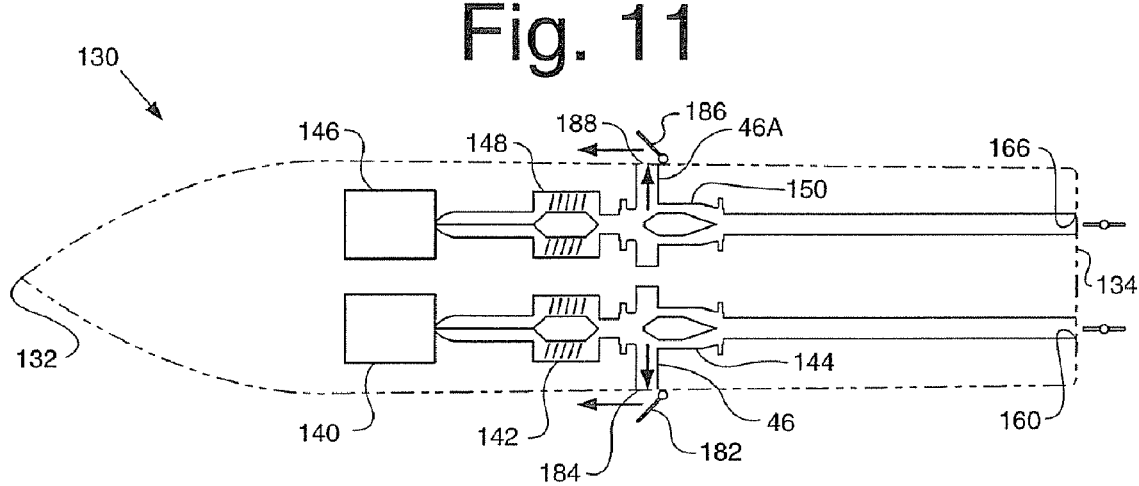
FIG. 11 is a plan view of the ship of FIG. 9 reversing thrust towards the bow.
Figure 12:
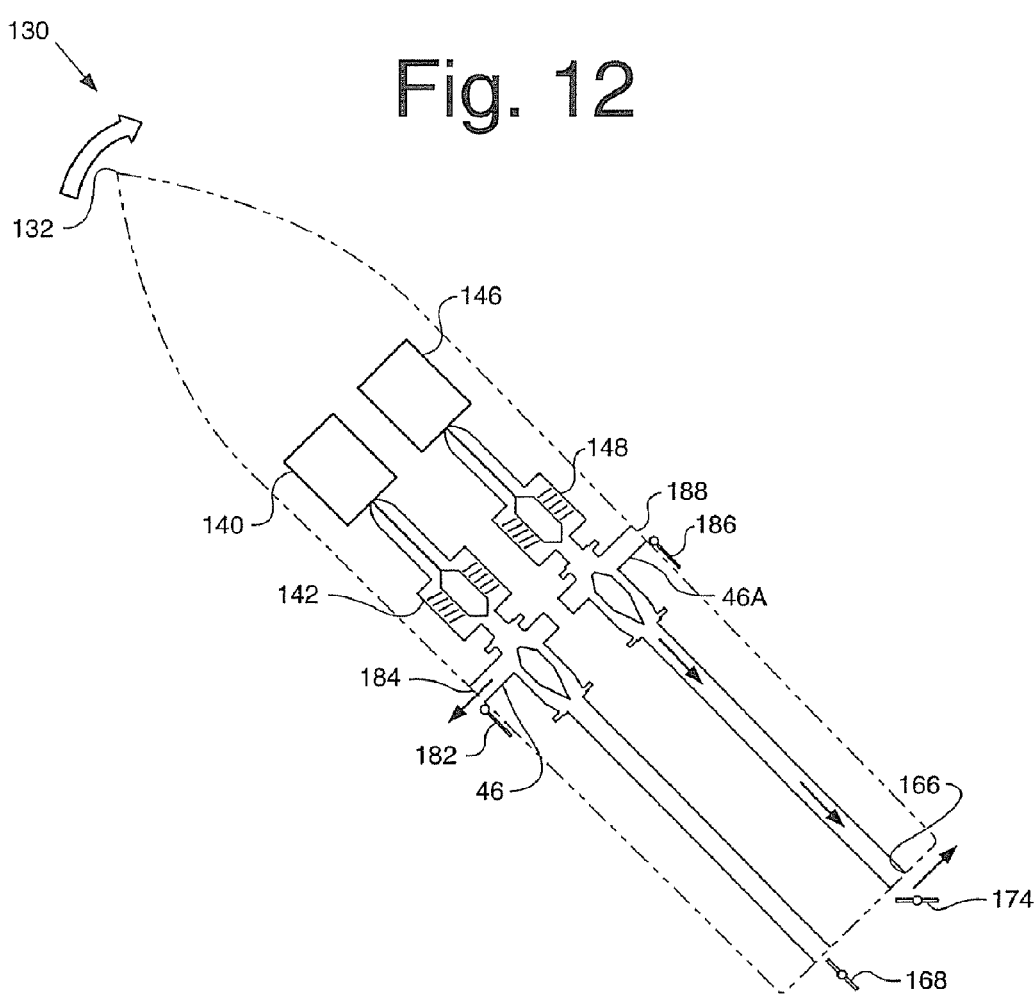
FIG. 12 is a plan view of the ship of FIG. 9 using the mid-ships thrusters to maneuver.

FIG. 11 is a plan view of the watercraft 130 of FIG. 9, except the port thrust controller 144 and the starboard thrust controller 150 have been actuated so fluid passes through the bypass outlet 46 and 46A respectively as indicated by the flow arrows and not the port thrust conduit outlet 160 or the starboard thrust conduit outlet 166 at the stern 134. In addition, the adjustable port turning plane 182 and the adjustable starboard turning plane 186 have been opened to redirect the fluid flow towards the bow 132 of the watercraft 130. Fluid flow as shown in FIG. 11 will slow forward progress of the watercraft, if it has been making way, and will ultimately bring the watercraft to a stop. If the watercraft is not making way, the fluid flow in FIG. 11 will cause the watercraft to move in a reverse direction.

Figure 13:
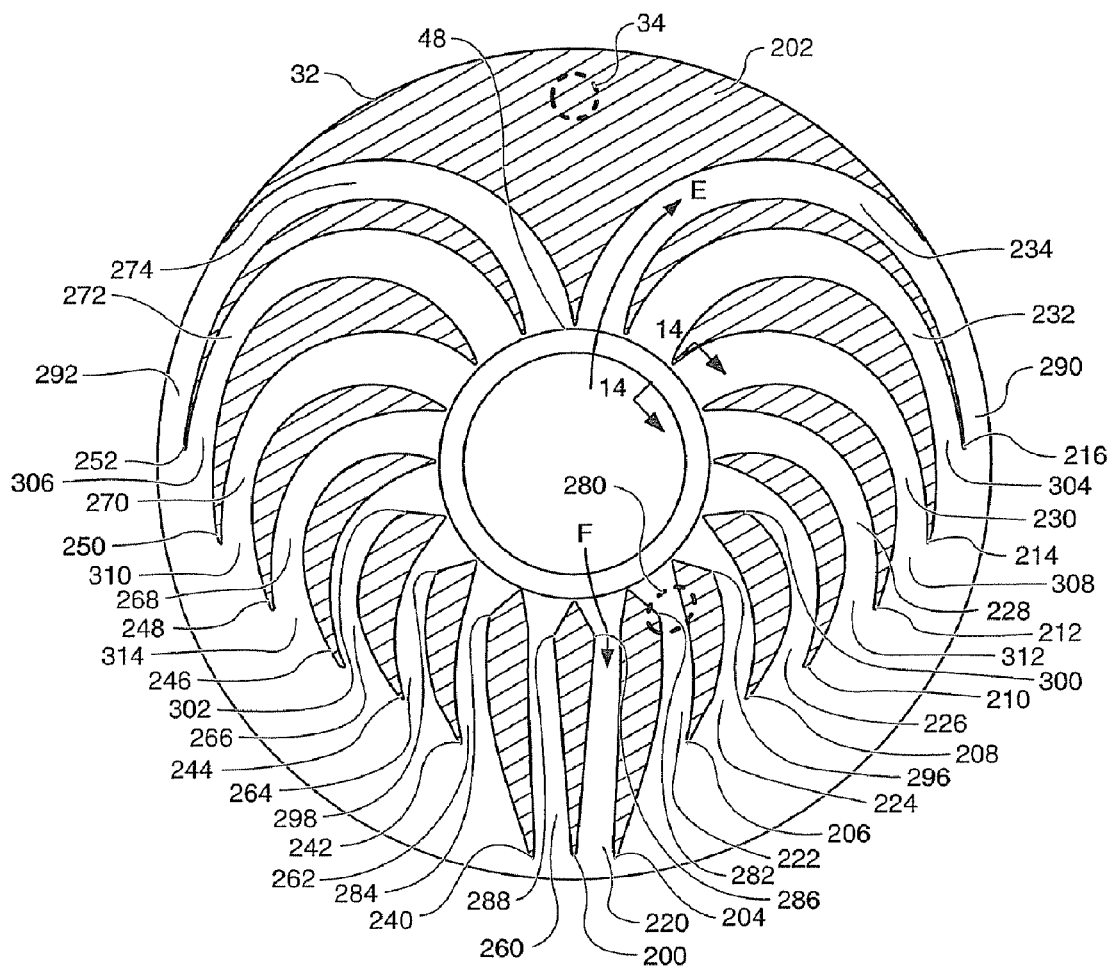
FIG. 13 is a plan view of the flow diffuser.

FIG. 13 is a plan view of the watercraft 130 of FIG. 9, except the port thrust controller has been actuated so fluid exits through the bypass outlet 46 as shown by the flow arrow. Further, the starboard rudder has been turned to direct fluid flow from the starboard thrust conduit outlet 166 in the starboard direction. The net effect of the fluid flow pattern shown in FIG. 12 is to turn the watercraft in the starboard direction as indicated by the arrow at the bow 132.

FIG. 13 is a plan view of the removable flow diffuser 32 along the line 13-13 of FIG. 1. The cylindrical closure 72 and the pointed bolt 70 have been omitted from FIG. 13 to better show the flow diffuser 32. The alignment pin 34 is shown in phantom and is responsible for properly aligning the vanes in the three-way valve 14. Similar flow diffusers are shown in U.S. Pat. Nos. 5,469,388; 6,250,330; 6,289,934 and 6,439,267 which are incorporated herein by reference.

Figure 14:
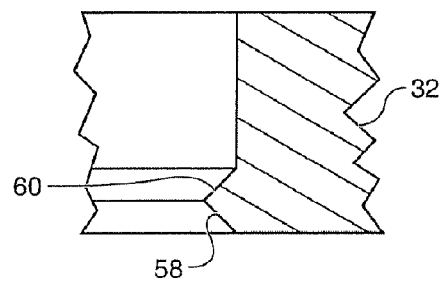
FIG. 14 is an enlarged section view of the primary valve seat and the bypass valve seat in the flow diffuser along the line 14-14 of FIG. 13.

FIG. 14 is an enlargement of the primary valve seat 58 and the bypass valve seat 60 which are a part of the removable flow diffuser 32. The opposing valve seats 58 and 60 are not shown in the aforementioned four patents concerning flow diffusers.

In FIG. 13, a front central vane 200 points towards the bypass outlet 46 as better seen in FIG. 1. A rear central vane 202 receives the alignment pin 34 shown in phantom. Disposed between the front central vane 200 and the rear central vane 202 is a first right vane 204, a second right vane 206, a third right vane 208, a fourth right vane 210, a fifth right vane 212, a sixth right vane 214 and a seventh right vane 216. Between the front central vane 200 and the first right vane 204 is a first right flow passageway 220. Between the first right vane 204 and the second right vane 206 is a second right flow passageway 222. Between the second right vane 206 and the third right vane 208 is a third right flow passageway 224. Between the third right vane 208 and the fourth right vane 210 is a fourth right flow passageway 226. Between the fourth right vane 210 and the fifth right vane 212 is a fifth right flow passageway 228. Between the fifth right vane 212 and the sixth right vane 214 is a sixth right flow passageway 230. Between the sixth right vane 214 and the seventh right vane 216 is the seventh right flow passageway 232. Between the seventh right vane 216 and the rear central vane 202 is an eighth flow passageway 234.

Between the front central vane 200 and the first left vane 240 is a first left flow passageway 260. Between the first left vane 240 and the second left vane 242 is a second left flow passageway 262. Between the second left vane 242 and the third left vane 244 is a third left flow passageway 264. Between the third left vane 244 and the fourth left vane 246 is a fourth left flow passageway 266. Between the fourth left vane 246 and the fifth left vane 248 is a fifth left flow passageway 268. Between the fifth left vane 249 and the sixth left vane 250 is a sixth left flow passageway 270. Between the sixth left vane 250 and the seventh left vane 252 is a seventh left flow passageway 272. Between the seventh left vane 252 and the rear central vane 202 is the eighth left flow passageway 274.

Figure 15:
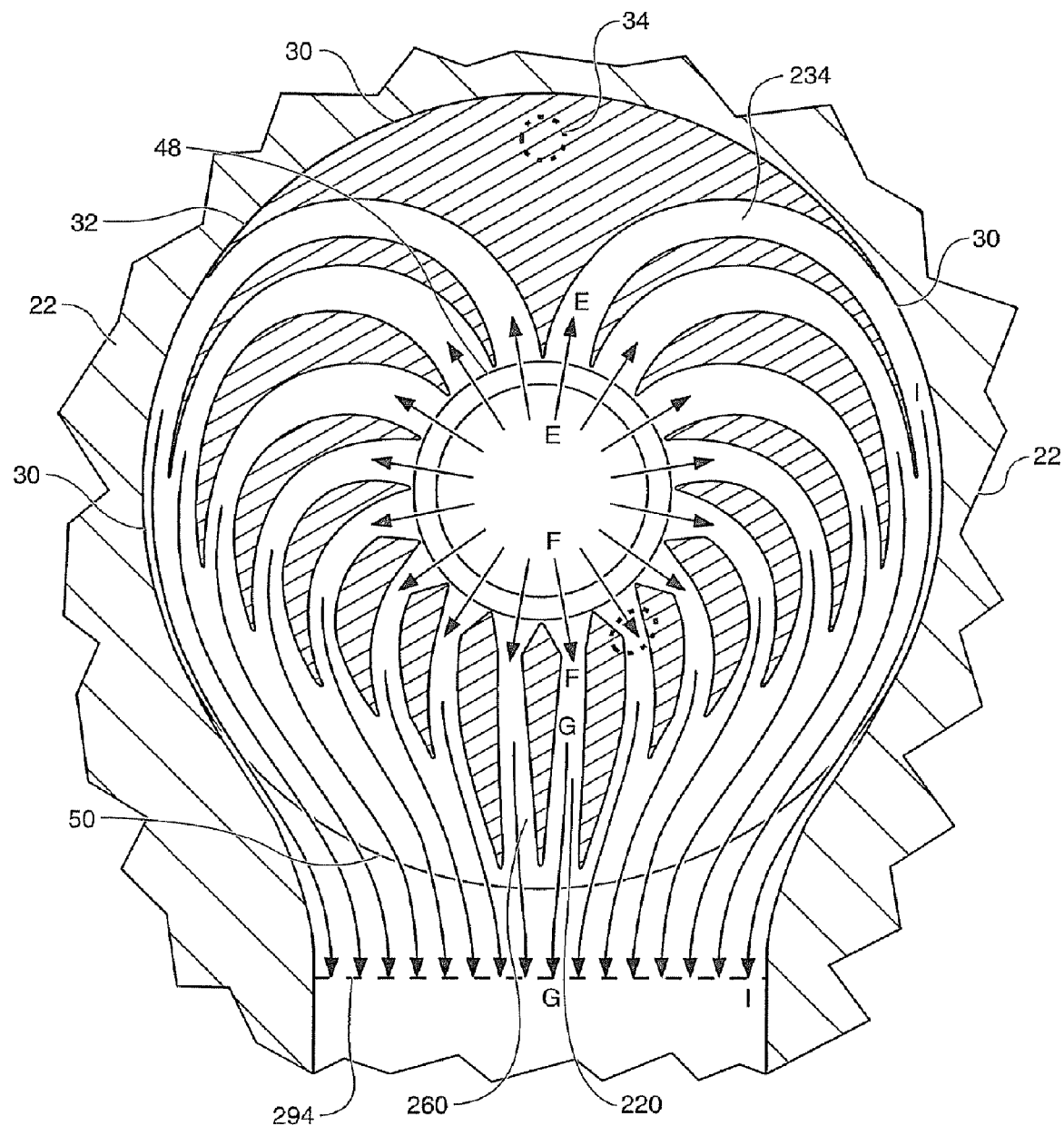
FIG. 15 is a plan view of the flow diffuser in the receptacle formed by the body of the three-way valve. A plurality of flow arrows indicates a generally flat velocity profile of fluid passing through the flow diffuser.

Referring now to FIGS. 5, 13 and 15, fluid enters the three-way valve 14 as shown by the flow arrow A, through the run inlet 40. The fluid then passes through the bypass valve element 56 as indicated by the flow arrows E and F. The fluid then flows into the bypass inlet 44, the circular flow diffuser inlet 48 and into the right flow passageways 220, 222, 224, 226, 228, 230, 232 and 234 and the left flow passageways, 260, 262, 264, 266, 268, 270, 272 and 274. The flow path of the fluid into the flow diffuser is best seen in FIG. 15 and is represented by the starburst of flow arrows at the center of the figure.

The shortest pathway from the flow diffuser inlet 48 to the flow diffuser outlet 50 is through the first right flow passageway 220 and the first left flow passageway 260. The flow arrow F shows fluid passing from the flow diffuser inlet 48 into the first right flow passageway 220. The flow arrow G shows fluid leaving the first right flow passageway and passing through the flow diffuser outlet 50. The longest distance that fluid must travel from the flow diffuser inlet 48 to the flow diffuser outlet 50 is through the eighth right flow passageway 234 and the eighth left flow passageway 274. The flow arrow E shows fluid leaving the flow diffuser inlet 48 and passing into the eighth right flow passageway 234. The flow arrow I shows fluid leaving the eighth right flow passageway 234 and the flow diffuser outlet 50.

The prior art flow diffuser of U.S. Pat. No. 6,439,267 created a non-uniform velocity flow profile as shown pictorially in FIG. 15 of that patent. One purpose of the flow diffuser 32 of the present invention is to produce a generally flat velocity profile indicated by the dashed line 294, as better seen in FIG. 15 of the present patent application. A generally flat velocity profile 294 is helpful to ultrasonic flow meters. The non-uniform velocity profile in the prior art sometimes distorts the accuracy of ultrasonic flow meters.

The generally flat velocity profile 294 of the present application is created by strategically positioning choke points and flow restrictions in the left and right flow passageways to slow down some fluid molecules and to accelerate others. The fluid molecules, represented by flow arrows F and G, moving through the shortest passageways, i.e. 220 and 260 must be slowed down and the fluid molecules, represented by flow arrows E and I, moving through the longest passageways, i.e. 234 and 274 must be accelerated.

Referring now to FIGS. 5, 13 and 15, the flow paths through the flow diffuser will be discussed in greater detail and the control of the velocities through various flow passageways will be explained. The choke point indicated by the dashed circle 280, better seen in FIG. 13, encloses a protrusion 282 on first right vane 204. The protrusion 282 creates a choke point at the dashed circle 280 in the second right flow passageway 222 which slows the speed of fluid as it passes through the choke point 280. A similar protrusion 284 is formed on first left vane 240 which slows the speed of fluid as it passes through the second left flow passageway 262. A right protrusion 286 is formed on the right side of front central vane 200 and a left protrusion 288 is formed on the left side of the front central vane 200 creating choke points in the first right passageway 220 and the first left flow passageway 260. The closer the protrusions are to the circular flow diffuser inlet 48, the more the fluid flow is slowed down as a result of the Venturi exit after the choke point. In contrast, the right flow constriction 290 in the eighth right flow passageway 234 and the left flow constriction 292 in the eighth left flow passageway 274 are as far away from the circular flow diffuser inlet 48 as possible to speed up the fluid flow in the two longest passageways. The fluid molecules traveling through the flow passageways, 220 and 260 have the shortest distance to travel from the circular flow diffuser inlet 48, better seen in FIG. 5, to the flow diffuser outlet 50, as better seen in FIGS. 5 and 15; thus the velocity of these molecules needs to be slowed down by the choke points 286 and 288 to give the molecules traveling a greater distance time to catch up, such as those traveling in the eighth right flow passageway 234 and the eighth left flow passageway 274. Choke points 282 and 284 are placed in the flow passageways 222 and 262 in which the fluid molecules have a shorter distance of travel compared with flow passageways 232 and 272 which have a longer distance to travel from the circular flow diffuser inlet 48 to the flow diffuser outlet 250. A protrusion 296 is formed on vane 206, creating a choke point in right flow passageway 226 to slow the velocity of the fluid molecules; a protrusion 298 is formed on vane 242 creating a choke point in left flow passageway 264 to slow the velocity of the fluid molecules. An additional protrusion 298 is formed on vane 242 and protrusion 300 is formed on vane 242, again creating choke points to slow the velocity of the fluid molecules passing through the aforementioned passageways.

In the longer flow passageways, flow restrictions are placed as far away from the flow diffuser inlet 49 as possible to speed up the flow of fluid molecules so they can catch up with those traveling through the shorter passageways. A flow restriction 304 is placed in the right flow passageway 234 and a flow restriction 306 is placed in the left flow passageway 272. Likewise, a flow restriction 308 is placed in right flow passageway 230 and a flow restriction 310 is placed in left flow passageway 270. A flow restriction 312 is placed in right flow passageway 228 and a flow restriction 314 is placed in left flow passageway 268 to speed up the fluid molecules so the overall velocity profile 294 is substantially flat.

The cross sectional profile of the bypass outlet 46 is similar to the cross sectional profile shown in FIGS. 6-9 of U.S. Pat. No. 6,289,934, which is incorporated herein by reference. The cross sectional area of the run inlet 40 shall be approximately equal to the cross sectional area of the run outlet 42. The cross sectional area of the run inlet 40 shall be approximately equal to the cross sectional area of the bypass outlet 46.

What is claimed is:

1. A three-way valve comprising:
    a body defining a flow passageway in fluid communication with a run valve inlet and an outlet, the run valve inlet also in fluid communication with a bypass valve inlet and outlet;
    a removable flow diffuser in a receptacle in the body, the flow diffuser having a flow diffuser inlet in fluid communication with the bypass valve inlet and a flow diffuser outlet in fluid communication with the bypass valve outlet;
    a movable valve element sized and arranged to alternatively engage and seal against a primary valve seat and a bypass valve seat, both seats formed on the removable flow diffuser;
    a support extending from the body to position the movable valve element in the flow passageway;
    the movable valve element slidably engaging the body on the end proximate the run valve inlet; and
    means to move the valve element from a full open position with the bypass valve in a full closed position, to a full closed position with the bypass valve in a full open position, to various intermediate positions in which both the primary valve and the bypass valve are in partially open positions.

2. The apparatus of claim 1 wherein the movable valve element includes:
    a primary valve element to engage the primary valve seat;
    a bypass valve element to engage the bypass valve seat having;
    a cylindrical closure;
    a plurality of webs extending from the cylindrical closure to a center of the closure; and
    means for connecting the cylindrical closure to the primary valve element.

3. The apparatus of claim 1 wherein the flow passageway has an area about the same as a cross sectional area of the run valve inlet.

4. The apparatus of claim 1 wherein the support includes a stationary tail cone with a tapered angle of no more than 7° when measured from the run valve outlet and at least one vane extending from the body to the tail cone.

5. The apparatus of claim 1 wherein the support includes a stationary tail cone with a tapered angle of about 7° when measured from the run valve outlet and at least one vane extending from the body to the tail cone.

6. The apparatus of claim 1 wherein the flow diffuser has chokes in some of the fluid passageways to create a substantially flat velocity profile in the fluid at the bypass valve outlet.

7. A three-way valve comprising:
    means for forming a flow passageway in fluid communication with a run valve inlet and a run valve outlet, the run valve inlet also in fluid communication with a bypass valve inlet and outlet;
    means for diffusing flow, the flow diffuser means having a flow diffuser inlet in fluid communication with the bypass valve inlet and a flow diffuser outlet in fluid communication with the bypass valve outlet;
    means for sealing against a primary valve seat and alternatively against a bypass valve seat;
    means for supporting the sealing means; and
    means to concurrently move the sealing means from a full open position for the primary valve seat and a full closed position for the bypass valve seat, to a full closed position for the primary valve seat and a full open position for the bypass valve seat, to various intermediate positions in which both the primary valve seat and the bypass valve seat are in partially open positions.

* * * * *